United States Patent [19]

Chisolm

[11] 3,993,276

[45] Nov. 23, 1976

[54] SPRING HOLDER TOOL

[75] Inventor: Randall N. Chisolm, Brooklyn, N.Y.

[73] Assignee: Lawrence Peska Associates, Inc., New York, N.Y. ; a part interest

[22] Filed: Aug. 20, 1975

[21] Appl. No.: 606,201

[52] U.S. Cl. .................................. 248/352; 254/10.5

[51] Int. Cl.$^2$ .......................................... B23P 19/04

[58] Field of Search ........................ 248/352; 29/227; 254/10.5, 2 R, 2 B

[56] References Cited

UNITED STATES PATENTS

| | | | |
|---|---|---|---|
| 1,389,657 | 9/1921 | Harsley et al. | 254/10.5 UX |
| 1,978,471 | 10/1934 | Mizer et al. | 29/227 UX |
| 2,789,342 | 4/1957 | Pouell | 254/10.5 UX |
| 2,937,002 | 5/1960 | Schultz | 254/2 B X |
| 3,271,006 | 9/1966 | Brown et al. | 254/2 B |
| 3,341,175 | 9/1967 | Branick | 254/10.5 |
| 3,764,107 | 10/1973 | Mlynarczyk | 254/10.5 |

*Primary Examiner*—J. Franklin Foss

[57] ABSTRACT

A spring holder tool is used to maintain a helical shaped frame support of an automobile in a compressed state. A circular shaped member having a cup shaped depression on the top lateral face is affixed to the end of a horizontal trihedron shaped extension arm wherein the horizontal extension arm is supported by a movable vertical support assembly. The circular shaped member is inserted between two convolutions of an expanded support spring. When the expansion force is released from the support spring, the portion of the support spring above the spring holder tube is maintained in a compressed state at a given vertical height.

1 Claim, 2 Drawing Figures

SPRING HOLDER TOOL

SUMMARY OF THE INVENTION

My invention relates to a unique and novel tool for maintaining a helical shaped frame supporting spring of an automobile at a given vertical height, while a person performs work on the automobile.

It is known from U.S. Pat. Nos. 2,811,772 and 3,051,443 that spring compressing tools have been employed for maintaining a helical type spring in a compressed shape, but these aforementioned tools are complicated in design and use.

Accordingly, it is an object of my invention to provide an inexpensive tool for maintaining a helical type automobile frame supporting spring in a compressed state at a given vertical height.

An advantage of my invention over previously cited patents is that is provides a tool of simple construction with a relatively low manufacturing cost. Briefly, my invention comprises a rectangular box shaped base having a plurality of casters. A telescoping elongated rectangular shaped member is perpendicularly affixed to the center of the top base of the rectangular box shaped base. A handle is affixed to a longitudinal side of the bottom section of the rectangular shaped member. A horizontal trihedron shaped extension arm is affixed to the top of the top section of rectangular shaped member in a trans-position to the handle. A circular shaped member is affixed to the outer end of the extension arm. The circular shaped member is inserted between two convolutions of the supporting spring, while the support spring is in an expanded state. The portion of the support spring above the spring holder tool is maintained in a compressed state at a given vertical height, when the expansion force is released from the spring. The expansion force is easily applied to the support spring by conventional jacking of the automobile with a bumper jack.

BRIEF DESCRIPTION OF THE DRAWINGS

The objects and features of the invention may be understood with reference to the following detailed description of an illustrative embodiment of the invention, taken together with the accompanying drawings in which:

FIG. I illustrates a front perspective view of the spring holder tool; and

Figures 1, 2:
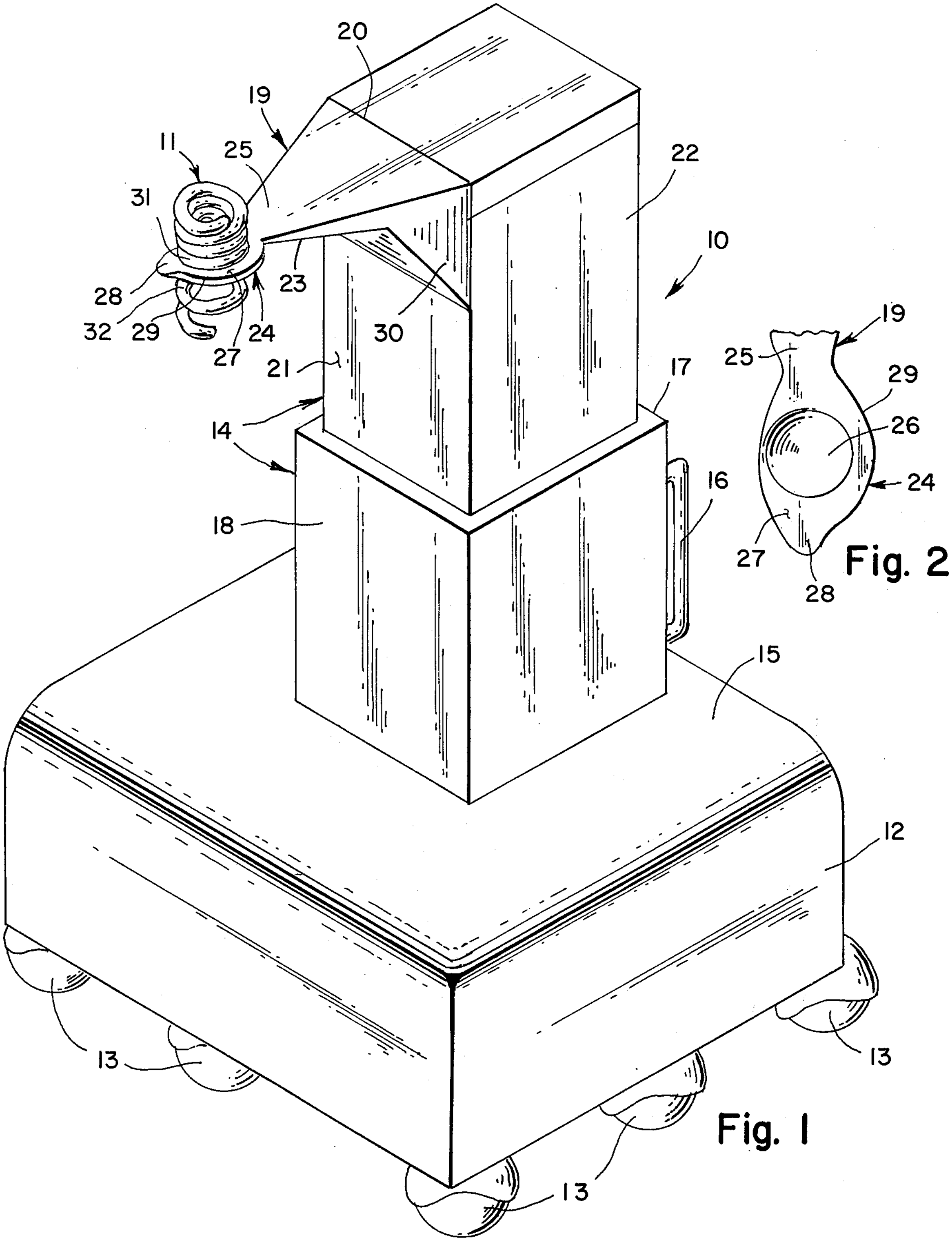

FIG. II illustrates a top sectional view of the circular shaped member of the spring holder tool.

DESCRIPTION OF THE PREFERRED EMBODIMENT

Turning now descriptively to the drawings, in which similar reference characters denote similar elements throughout the several views, FIG. I shows a spring holder tool 10 used to maintain a helical shaped frame support spring 11 in a compressed state at a given vertical height. The spring holder tool 10 comprises a weighted box shaped base 12 mounted on a plurality of casters 13. A telescoping elongated rectangular shaped member 14 is affixed perpendicularly to the center of the top base 15 of the box shaped base 12. A U-shaped handle 16 is affixed to a first longitudinal sidewall 17 of the bottom section 18 of the telescoping member 14. A horizontal trihedron shaped extension arm 19 extends outward from a top edge 20 of a second longitudinal sidewall 21 of the top section 22 of the telescoping member 14, wherein the first longitudinal sidewall 17 is parallel to the second longitudinal sidewall 21. A support flange 30 is affixed between the bottom side 23 of the extension arm 19 and the second longitudinal sidewall 21. A horizontal circular shaped member 24 is affixed to the outer end 25 of the extension arm 19. A cup shaped depression 26 as shown in FIG. 2 is contained in the center of the top base 27 of circular shaped member 24. A horizontal extension lip 28 is affixed to the outside periphery 29 of member 24 at a point trans to the juncture of circular shaped member 24 and extension arm 19.

The spring 11 is expanded by jacking up the automobile with a conventional bumper jack. The circular shaped member 24 is inserted between two convolutions 31, 32 of the spring 11 such that the upper convolution 31 rest in the cup shaped depression 26, when the expansion force is released from the spring 11. The portion of the spring 11 above the circular shaped member 24 is maintained in a compressed state at a given vertical height. When the spring holder tool 10 is in use, the second longitudinal sidewall 21 of member 14 is flush to the front face of the wheel drum with the expansion arm 19 extending over the top periphery of the wheel drum.

Since obvious changes may be made in the specific embodiment of the invention described herein, such modifications being within the spirit and scope of the invention claimed, it is intended as illustrative and not as limiting in scope.

Having thus described the invention, what I claim as new and desire to secure by Letters Patent of the United States is:

1. A spring holder tool for maintaining a helical shaped frame support spring of an automobile in a compressed state at a given vertical height, which comprises:

a. a weighted box shaped base;

b. a telescoping elongated rectangularly shaped member having a bottom and a top section, said bottom section perpendicularly affixed to a center of a top of said box shaped base;

c. a handle affixed to a longitudinal side of said bottom section;

d. a horizontal extension arm affixed to an upper end of a longitudinal side of said top section;

e. a support flange extending between said extension arm and said longitudinal side of said top section;

f. a plurality of casters affixed to a bottom of said weighted base;

g. a circularly shaped member having a cup shaped depression in an upper surface of said circularly shaped member, said circularly shaped member affixed to an outer end of said extension arm, wherein said circularly shaped member extends linearly outwardly from said extension arm, said circularly shaped member being received between two convolutions of said spring, said upper convolution resting in said cup shaped depression; and h. an extension lip affixed to an outside periphery of said circularly shaped member.

* * * * *